(12) United States Patent
Chae et al.

(10) Patent No.: US 9,043,709 B2
(45) Date of Patent: May 26, 2015

(54) ELECTRONIC DEVICE AND METHOD FOR PROVIDING MENU USING THE SAME

(75) Inventors: Jisuk Chae, Gyeonggi-do (KR); Hyunmin Kim, Seoul (KR); Byunghun Lee, Seoul (KR); Sayoon Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 782 days.

(21) Appl. No.: 13/220,223

(22) Filed: Aug. 29, 2011

(65) Prior Publication Data

US 2012/0096406 A1 Apr. 19, 2012

(30) Foreign Application Priority Data

Oct. 14, 2010 (KR) ........................ 10-2010-0100494

(51) Int. Cl.
*G06F 3/0488* (2013.01)
*G06F 3/0482* (2013.01)

(52) U.S. Cl.
CPC .......... *G06F 3/04883* (2013.01); *G06F 3/0482* (2013.01)

(58) Field of Classification Search
CPC ................................................... G06F 3/0488
USPC ........................................................ 715/863
See application file for complete search history.

(56) References Cited

U.S. PATENT DOCUMENTS

| 6,567,801 | B1 * | 5/2003 | Chiang et al. ........................ 1/1 |
| 6,584,469 | B1 * | 6/2003 | Chiang et al. ........................ 1/1 |
| 6,785,670 | B1 * | 8/2004 | Chiang et al. ................ 707/706 |
| 7,512,904 | B2 * | 3/2009 | Matthews et al. ............. 715/854 |
| 7,600,197 | B2 * | 10/2009 | Gourdol et al. ............... 715/817 |
| 7,805,676 | B2 * | 9/2010 | Schemers et al. ............. 715/711 |
| 8,200,651 | B2 * | 6/2012 | Bonanni et al. ............... 707/707 |
| 8,321,802 | B2 * | 11/2012 | Rogers .......................... 715/769 |
| 8,332,400 | B2 * | 12/2012 | Cooke ........................... 707/731 |
| 8,356,254 | B2 * | 1/2013 | Dennard et al. ............... 715/764 |
| 8,686,944 | B1 * | 4/2014 | Charlton et al. ............... 345/163 |
| 8,718,624 | B2 * | 5/2014 | Kim et al. ...................... 455/415 |
| 8,782,566 | B2 * | 7/2014 | Sarkar et al. .................. 715/863 |
| 2002/0057262 | A1 * | 5/2002 | Patrick et al. ................. 345/179 |
| 2002/0169764 | A1 * | 11/2002 | Kincaid et al. ..................... 707/3 |
| 2002/0175955 | A1 * | 11/2002 | Gourdol et al. ............... 345/821 |
| 2006/0125803 | A1 * | 6/2006 | Westerman et al. .......... 345/173 |
| 2006/0168541 | A1 * | 7/2006 | Hill et al. ...................... 715/810 |

(Continued)

FOREIGN PATENT DOCUMENTS

| EP | 0883069 A1 | 12/1998 |
| EP | 1 473 624 | 11/2004 |
| KR | 10-2001-0091756 A | 10/2001 |

OTHER PUBLICATIONS iPhone User Guide for iPhone OS 3.1 Software manufactured by Apple, released on Sep. 2009; 217 pages.*

(Continued)

*Primary Examiner* — Reza Nabi
(74) *Attorney, Agent, or Firm* — KED & Associates LLP

(57) ABSTRACT

An electronic device and a method for providing a menu are disclosed. The electronic device displays a plurality of words on the screen, detects a first action specifying selection of at least one of the displayed words, searches an option item related to the word selected by the first action, generates at least one menu item based on the selected word and the searched option item, and displays the generated menu item in a first area of the screen.

8 Claims, 15 Drawing Sheets

(56) References Cited

U.S. PATENT DOCUMENTS

| | | | |
|---|---|---|---|
| 2008/0077571 A1* | 3/2008 | Harris et al. | 707/5 |
| 2008/0195954 A1* | 8/2008 | Dharmarajan et al. | 715/749 |
| 2009/0019024 A1* | 1/2009 | Heidloff et al. | 707/4 |
| 2009/0055356 A1* | 2/2009 | Hanyu | 707/3 |
| 2009/0103780 A1* | 4/2009 | Nishihara et al. | 382/103 |
| 2009/0187547 A1* | 7/2009 | Bonanni et al. | 707/3 |
| 2010/0050133 A1* | 2/2010 | Nishihara et al. | 715/863 |
| 2010/0114916 A1* | 5/2010 | Cooke | 707/752 |
| 2010/0122194 A1* | 5/2010 | Rogers | 715/769 |
| 2010/0306237 A1* | 12/2010 | Chandley et al. | 707/769 |
| 2011/0289455 A1* | 11/2011 | Reville et al. | 715/830 |
| 2011/0289456 A1* | 11/2011 | Reville et al. | 715/830 |
| 2012/0083294 A1* | 4/2012 | Bray et al. | 455/466 |
| 2012/0094626 A1* | 4/2012 | Kim et al. | 455/403 |
| 2012/0096377 A1* | 4/2012 | Lee et al. | 715/769 |
| 2013/0060751 A1* | 3/2013 | Cooke | 707/709 |
| 2013/0066902 A1* | 3/2013 | Iida et al. | 707/769 |
| 2013/0191373 A1* | 7/2013 | Kaul et al. | 707/722 |
| 2013/0229344 A1* | 9/2013 | Ivanich et al. | 345/156 |
| 2014/0053106 A1* | 2/2014 | Spencer | 715/813 |

OTHER PUBLICATIONS

European Search Report dated Apr. 11, 2012 for Application 11183932.0.

* cited by examiner

ELECTRONIC DEVICE AND METHOD FOR PROVIDING MENU USING THE SAME

CROSS-REFERENCE TO RELATED APPLICATION(S)

This application claims priority under 35 U.S.C. §119 to Korean Application No. 10-2010-0100494 filed on Oct. 14, 2010, whose entire disclosure is incorporated herein by reference.

BACKGROUND

1. Field

The present invention relates to an electronic device capable of configuring a menu which is convenient of a user to use, and a method for providing the menu using the same.

2. Background

Electronic devices including broadcasting receivers, personal computers, notebooks, mobile phones and the like may be configured to perform a variety of functions. Such a variety of functions may be a broadcasting receiving function, data/audio communication function, a motion picture taking function by using cameras, an audio storing function, a music file playing function via a speaker system, an image or video displaying function and the like. Some terminals may further have an additional game implementing function.

In addition, such an electronic device has been under development to be slim for portable convenience and to have an input device such as a touch pad and a touch screen for operational convenience. A conventional electronic device performs corresponding operations, once the touch pad and the touch screen are touched. Those operations are corresponding to a user's selection on a display screen. Also, those operations may include paging, scrolling, panning, zooming and the like.

According to the touch pad, when a user's finger is moving along a surface of the touch pad, motion of an input pointer is corresponding to relative motion of the user's finger. In contrast, a touch screen is a kind of a display screen having a touch sensing transparent panel covering a screen. When using the touch screen, the user may select directly points GUI object on the display screen by a stylus or a finger, to select a corresponding GUI.

BRIEF DESCRIPTION OF THE DRAWINGS

The embodiments will be described in detail with reference to the following drawings in which like reference numerals refer to like elements wherein.

DETAILED DESCRIPTION

Reference will now be made in detail to the specific embodiments of the present invention, examples of which are illustrated in the accompanying drawings. Wherever possible, the same reference numbers will be used throughout the drawings to refer to the same or like parts.

In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

Figure 1:
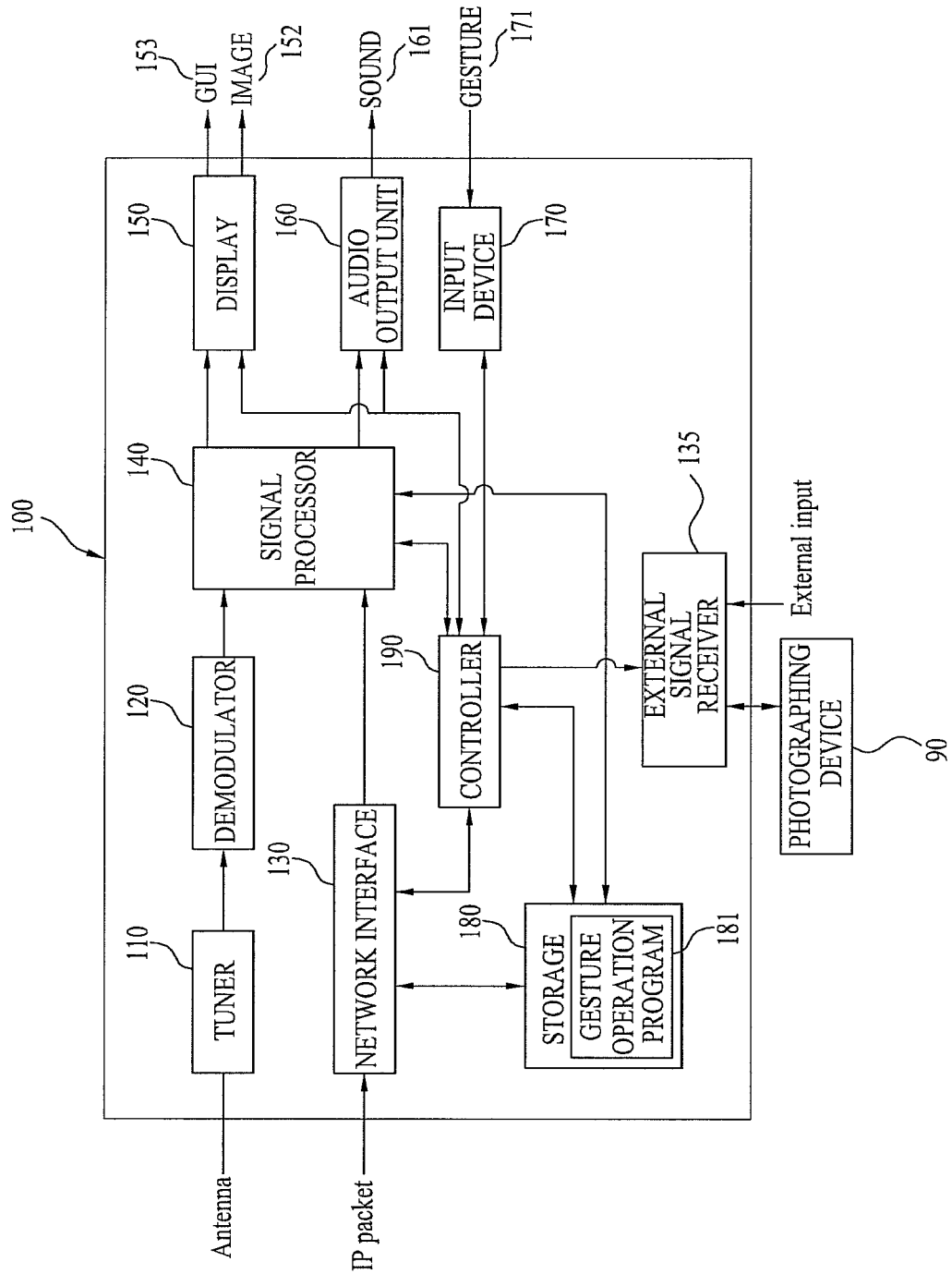
FIG. 1 is a diagram illustrating a configuration of an electronic device according to an exemplary embodiment of the present invention.

FIG. 1 is a block view illustrating a configuration of an electronic device according to an exemplary embodiment of the present invention.

In reference to FIG. 1, an electronic device 100 includes a tuner 110, a mobile communication unit 115, a demodulator 120, a network interface 130, a signal processor 140, a display 150, an audio output unit 160, an input device 170, a storage 180, a controller 190 and an external signal receiver 135. The electronic device 100 may be a personal computer system such as a desktop, laptop, tablet and handheld computer. The electronic device 100 may be a mobile terminal such as a mobile phone, smart phone, digital broadcasting terminal, PDA (Personal Digital Assistants), PMP (Portable Multimedia Player), navigation and the like or a fixed-type electric appliance such as a digital TV and the like.

The tuner 110 selects one of RF (Radio Frequency) broadcasting signals received via an antenna, corresponding to a channel selected by a user, and it converts the selected RF broadcasting signal into a middle frequency signal or a baseband video or audio signal. For example, when the selected RF broadcasting signal is a digital broadcasting signal, the tune 110 converts the selected RF broadcasting signal into a digital IF signal (DIF). When it is an analog broadcasting signal, the tuner 110 converts the selected RF broadcasting signal into an analog baseband video or video signal (CVBS SIF). That is, the tuner 110 may process the digital broadcasting signal or analog broadcasting signal. The analog baseband video or audio signal (CVBS SIF) outputted from the tuner 110 may be inputted to the signal processor 140 directly.

In addition, the tuner 110 may be receive a RF broadcasting with a single carrier according to ATSC (Advanced Television System Committee) or a RF broadcasting signal with a plurality of carriers according to DVB (Digital Video Broadcasting).

An electronic device 100 according to another embodiment of the present invention may include at least two tuners. When the at least two tuners are provided, a second tuner selects one of RF broadcasting signals received via the antenna, which is corresponding to a channel selected by the user, like a first tuner, and the second tuner converts the selected RF broadcasting signal into a middle frequency signal or baseband video or audio signal.

In addition, the second tuner sequentially selects RF broadcasting signals of the received RF signals, which are corresponding to all of the stored broadcasting channels via a channel memory function, and it converts them into the middle frequency signals or baseband video/audio signals. The second tuner may perform conversion of all of the broadcasting channels periodically. Because of that, the electronic device 100 may provide images of broadcasting signals converted by the first tuner and it may provide a thumbnail type of images converted by the second tuner simultaneously. In this case, the first tuner converts a main RF broadcasting signal selected by the user into a middle frequency signal or baseband video/audio signal, and the second tuner sequentially and periodically selects the other RF broadcasting signals except the main RF broadcasting signal and it converts them into middle frequency signals or baseband video/audio signals.

The demodulator 120 receives a digital IF signal (DIF) converted by the tuner 110 and it performs demodulation of DIF. For example, when the digital IF signal outputted from the tuner 110 is an ATSC system, the demodulator 120 performs 8-VBS (8-Vestigial Side Band) demodulation. Alternatively, when the digital IF signal outputted from the tuner 110 is a DVB system, the demodulator 120 performs demodulation of COFDMA (Coded Orthogonal Frequency Division Modulation).

The demodulator 120 may perform channel decoding. For that, the demodulator 120 may include a trellis decoder, a de-interleaver and a reed Solomon decoder to perform trellis decoding, de-interleaving and reed Solomon decoding.

After performing the demodulation and channel decoding, the demodulator 120 may output a stream signal (TS). At this time, the stream signal may be a signal multiplexed of video, audio and data signals. For example, the stream signal may be MPEG-2 is (Transport Stream) multiplexed of MPEG-2 format video signal, Dolby AC-3 format audio signal. Specifically, MPEG-2 Ts may include 4 byte header and 184 bite payload.

The stream signal outputted from the demodulator 120 may be inputted to the signal processor 140. After performing demultiplexing and signal processing, the signal processor 140 outputs an image to the transparent display 150 and it outputs a sound to the audio output unit 160.

In case of the digital broadcasting receiver having at least two tuners, the corresponding number of demodulators to the at least two tuners may be provided. The demodulators may be provided independently based on ATSC and DVB system.

The mobile communication unit 115 transmits and receives a wireless signal to and from at least one of a base station, an external terminal, a server. The wireless signal may include various types of data according to a speech call signal, video telephony call signal and texture/multimedia message transmitting/receiving.

The network interface 130 receives packets from the network and transmits the received packets to the network. That is, the network interface 130 receives IP packets configured to transport broadcasting data from the service providing server via the network. Here, the broadcasting data includes contents, an update message configured to notify contents updating, metadata, service information, software codes and A/V data. The service information may include service information on a real-time broadcasting service and service information on an internet service. Here, the internet service means a service provided via the internet, for example, a Cod (Content's on Demand) service, YouTube service, an information service for weather, news, community information and search, an entertainment service for a game and karaoke, and a communication service for TV mail and TV SMS (Short Message Service). As a result, the digital broadcasting receiver according to the present invention may include a network TV, web TV and broadband TV. Also, the broadcasting service may include an internet service as well as a broadcasting service provided via terrestrial, satellite and cable.

The controller 190 implements commands and it performs an operation related to the electronic device 100. For example, the controller 190 may control input and output and receiving and processing of data between components of the electronic device 100, using a command searched in the storage 180. The controller 190 may be represented on a single chip, a plurality of chips or a plurality of electric parts. For example, a variety of architectures including an exclusive or embedded processor, a single purpose processor, controller, ASIC and the like may be useable with respect to the controller 190.

The controller 190 implements a computer code together with an operating system and it performs generation and usage of data. The operating system is well-known in the art to which the present invention pertains and description of the operating system will be omitted. For example, the operating system may be Window series OS, Unix, Linux, Palm OS, DOS, Android and Macintosh and the like. The operating system, another computer code and data may exist in the storage connected with the controller 190.

Typically, the storage 180 provides storage for program codes and data used by the electronic device 100. For example, the storage 180 may be represented to be a ROM (Read only Memory), RAM (Random Access Memory), hard-disc drive. The program codes and data may exist in a separable storage medium or they may be loaded or installed on the electronic device 100. Here, the separable storage medium includes a CD-ROM, PC-CARD, memory card, floppy disc, magnetic tape and network component.

The display 150 may put into operation, connected with the controller 190. The display 150 may be represented to be an organic light emitting panel or plasma panel.

The display 150 may display a graphic user interface (GUI) 153 configured to provide an easy interface usable between the user of the electronic device and the operating system or a predetermined application implemented on the operating system. The GUI 153 represents a program, a file and operation options as graphic image. The graphic image may include a window, field, a dialog box, menu, icon, button, curser and scrollbar. Such images may be aligned in a layout defined in advance or they may be generated dynamically to help the user's specific handling. During the operation, the user may select and enable the image to start functions and works related to the variety of graphic images. For example, the user may select a button to implement opening, closing, minimizing and maximizing of a window or an icon to start a specific program.

The input device 170 may be a touch screen disposed on or in front of the display 150. The touch screen may be integral with the display 150 or an independent element. The touch screen may be named as touch screen display. When the touch screen is disposed in front of the display 150, the user may operate the GUI 153 directly. For example, the user may place only his or her finger on an object which will be controlled and there is no one-to-one relation on a touch pad.

The touch pad is placed on another plane, separated from the display 150. For example, the display 150 is typically located on a vertical plane and the touch pad is located in a horizontal plane. This allows usage of the touch pad less intuitive and it is quite difficult, compared with the touch screen. In addition to the touch screen, the input device 170 may be a multipoint input device.

The controller 190 may recognize a gesture 171 applied to the input device 170 and it may control the electronic device 100 based on this gesture 171. Here, the gesture may be defined as predetermined interaction with the input device 170, which is mapped onto at least one specific computing operation. The gesture 171 may be generated by a variety of human fingers, specifically, motion of human fingers. Alternatively, the gesture may be generated by a stylus in addition to the motion of human fingers.

The input device 170 receives the gesture 171 and the controller 190 implements commands configured to perform operations related to the gesture 171. Moreover, the storage 180 may include a gesture operation program 181 which may be a part of the operating system or auxiliary application. The gesture operation program 181 includes a series of commands to recognize generation of the gesture 171 and/or to instruct which step has to be taken in response to the gesture 171 to at least one software agent.

When the user generates one or more gestures, the input device 170 transports gesture information to the controller 190. Using a command transported from the storage 180, specifically, the gesture operation program 181, the controller 190 translates the gesture and it controls each component of the electronic device such as the storage 180, the display 150, the audio output unit 160, the signal processor 140, the network interface 130 and the input device. The gesture 171 may be detected as command for performing operation of an application stored in the storage 180, for modifying the GUI object displayed on the display 150, for modifying data stored in the storage 180 and for performing operation of the network interface 130 and the signal processor. For example, such commands may be related to zooming, panning, scrolling, page turning, rotating, size adjusting, image channel changing, content receiving and internet access. In addition, the commands may be related to starting of a specific program, opening of a file or document, menu viewing, selecting, command implementing, log-on an internet site system, allowing of an identified person to have access to a limited area of a computer system, loading of user profile related to user preference arrangement on a wall paper and/or the like.

A variety of difference gestures may be usable. For example, the gesture may be a single point or multipoint gesture, a static or dynamic gesture, a continuous or segmented gesture, and/or the like. The single point gesture is a gesture performed according to a single touch point. For example, this gesture is performed according to single touch such as a single human finger, palm or stylus. The multipoint gesture is a gesture performed according to multiple points. For example, this gesture is performed according to plural touches such as plural human fingers, human fingers and palm, human fingers and stylus, plural styli and/or combination of them. The static gesture is a gesture having no motion and the dynamic gesture is a gesture having motion. The continuous gesture is a gesture is a gesture performed according to a single stroke and the segmented gesture is a gesture performed according to an independent sequence of steps or strokes.

The object and the touch on the touch screen have a variety of different patterns, typically. For example, a single point gesture on the touch screen includes a down event and a following up event performed at an identical location or almost identical location of the down event. The dynamic gesture on the touch screen includes a down event and at least one dragging event following the down event and an up event following the at least one dragging event.

According to some embodiments, a parameter is used to describe a process in which a human finger approaches to the touch screen display to touch the touch screen display and to recede from the touch screen display. This parameter may be at least one function of the distance between the human finger and the touch screen display, the pressure of the human finger applied to the touch screen display, the touch area between the human finger and the touch screen, the voltage between the human finger and the touch screen, the capacitance between the human finger and the touch screen display and physical parameters.

According to some embodiments, when the size of the parameter between the human finger and the touch screen display (for example, the capacitance) is higher than a predetermined threshold value level, the down event is performed. While the parameter is the predetermined threshold value level or higher, with a curser position corresponding to the human finger moved from a position 'A' to a position 'B', the dragging is performed. When the parameter is lower than the threshold value level, the up event is performed.

The controller 190 may detect a word selecting action specifying selection of at least one of words displayed on a screen, a menu item selecting action specifying selection of one of displayed menu items, an option edit requesting action configured to request option items editing, an option editing action configured to edit option items, and a former screen requesting action configured to request change of the screen into a former screen. Here, the word selecting action, the menu item selecting action, the option edit requesting action, the option editing action and the former screen requesting action may include physical button selection of the electronic device 100, physical button selection of a remote controller, soft button selection, touch gesture performance and space gesture performance.

The external signal receiver 135 may provide an interface capable of connecting an external device with the electronic device 100. Here, the external device may be one of various kinds of video/audio output devices including a DVD (Digital Versatile Disk), Bluray, game device, camcoder, computer (notebook) and the like. The electronic device 100 may control a video/audio signal received from the external signal receiver 135 to be displayed and it may store or use a data signal.

In addition, the external device may be a photographing device 90. The photographing device 90 may include a plurality of cameras and it may image a person. The photographing device 90 recognizes a face area of the person and it focuses the face area, to zoom-in, and it images the face area. Here, a human hand shape imaged by the photographing device 100 may be recognized as space gesture. That is, the controller 190 may recognize the imaged hand shape as space gesture and it may implement commands configured to perform operations related to the recognized space gesture. Here, the space gesture may be defined as gesture recognized from an image frame or image received from the photographing device 90, with being mapped onto at least one specific computing operation.

Figure 2:
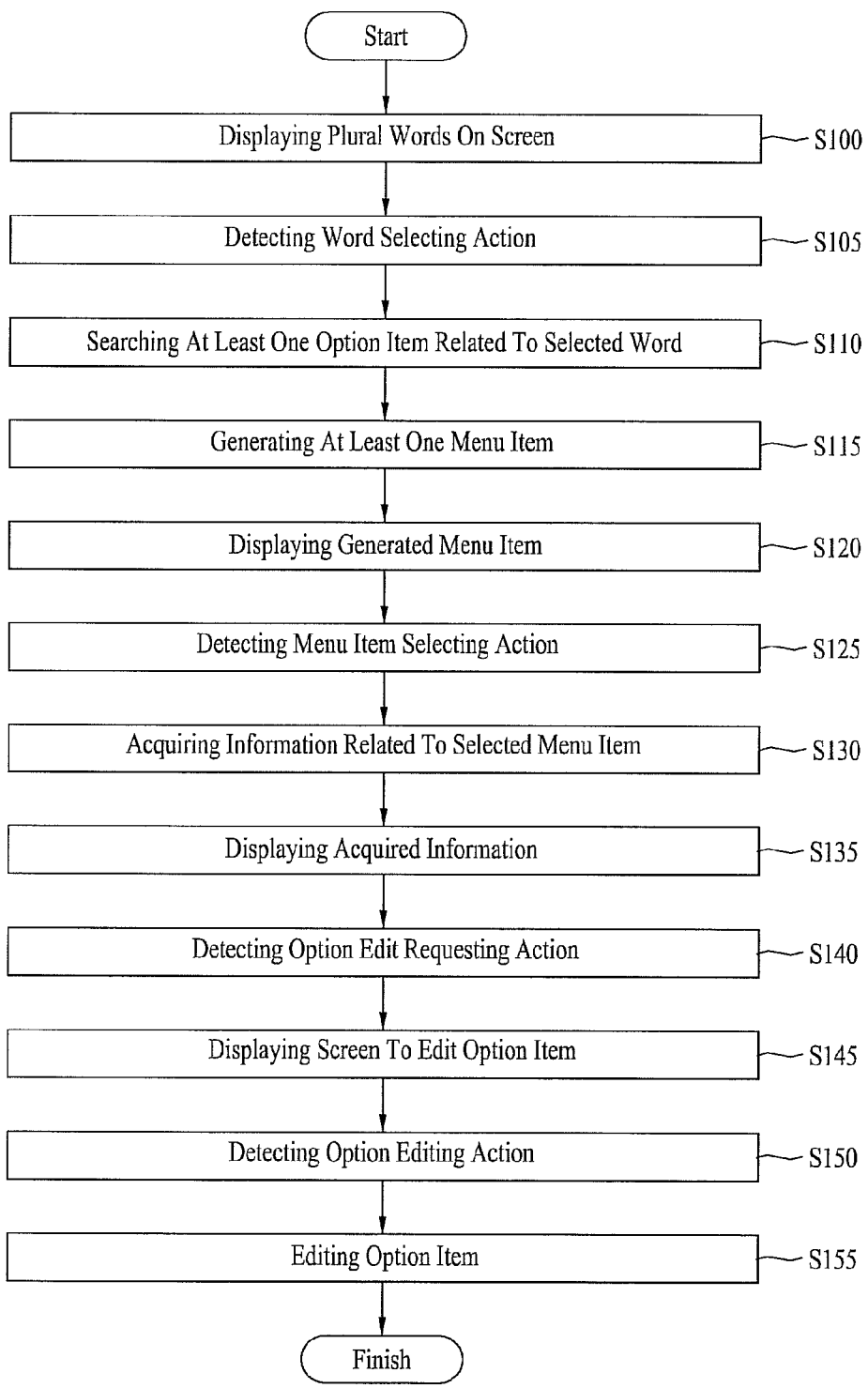
FIG. 2 is a flowchart illustrating a process of a method for providing a menu according to an exemplary embodiment of the present invention.

FIG. 2 is a diagram illustrating a process of a method for providing a menu according to an exemplary embodiment of the present invention.

In reference to FIG. 2, the display 150 displays a plurality of words on a screen. Here, the words may indicate at least one of place name, project name, name, shop name, building name and product name. The words may be words included in displayed contents or they may be words displayed by a predetermined implemented application.

Figure 3:
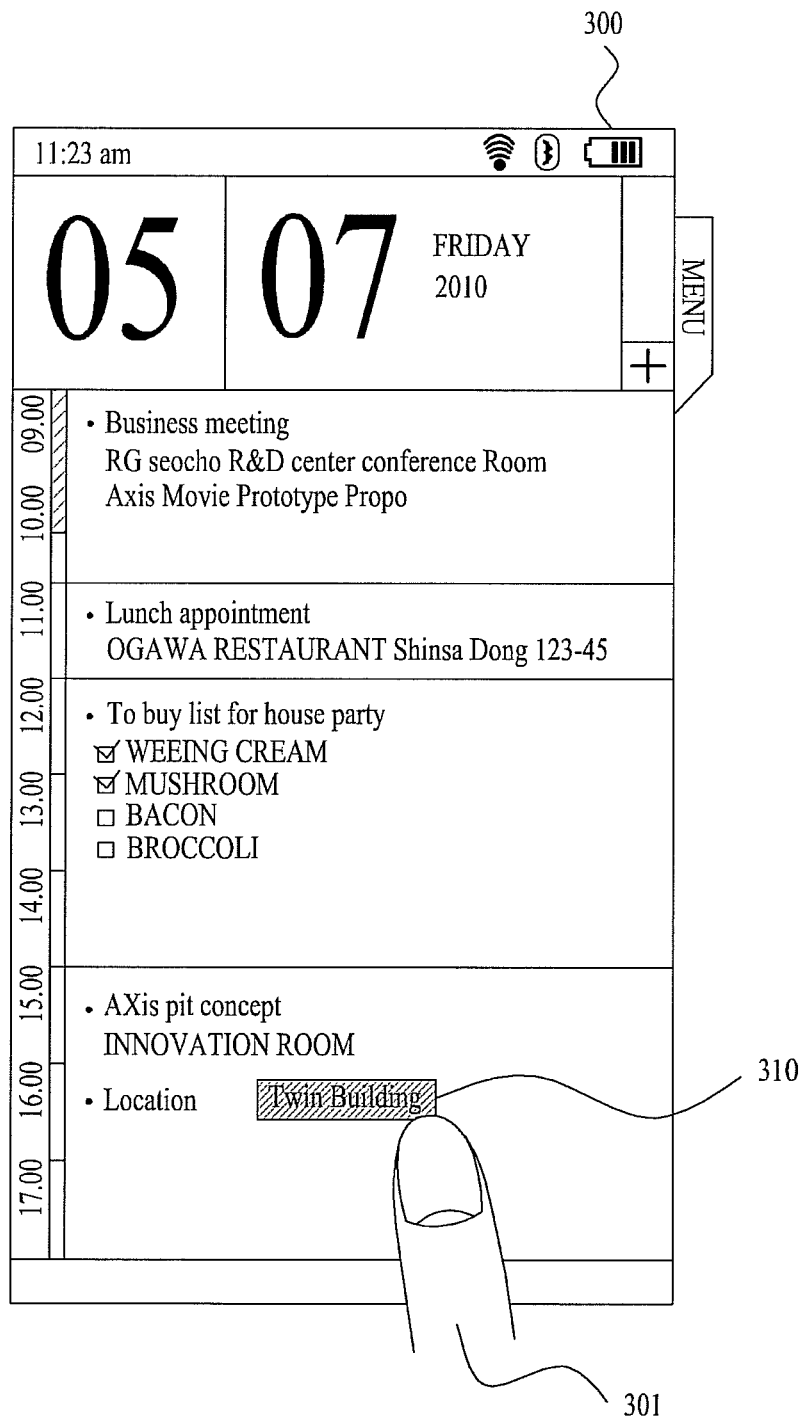
FIG. 3 is a diagram illustrating a screen displaying words according to an embodiment.

FIG. 3 is a diagram illustrating a screen displaying words according to an embodiment.

In reference to FIG. 3, the display 150 may display a screen 300 in the step of S100. The screen 300 may be a diary page displaying information about a day schedule.

The controller 190 detects word selecting action (S105). Here, the word selecting action may specify selection of a word or phrase including words. The user brings his or her finger 301 to a touch screen or touches a touch screen by the finger 301, to perform the word selecting action. The controller 190 may detect the word selecting action when a down event is generated at a point 310 having the word displayed thereon.

The controller 190 searches for an option item related to the word selected according to the word selecting action (S110). Here, the word selected according to the word selecting action may be a word displayed on the point having the down event generated thereon.

The option items forms an option set for option items related to a specific word, to be stored in the storage 180. For example, option items related to words indicating place name may compose a single option set. Option items related to words indicating shop name may compose a single option set. Option items related to words indicating product name may compose a single option set. Option items related to words indicating place name or building name may compose a single option set.

The controller 190 identifies information indicated by the selected word and it searches for an option item included in the option set related to the identified information as option item related to the selected word.

Figure 4:
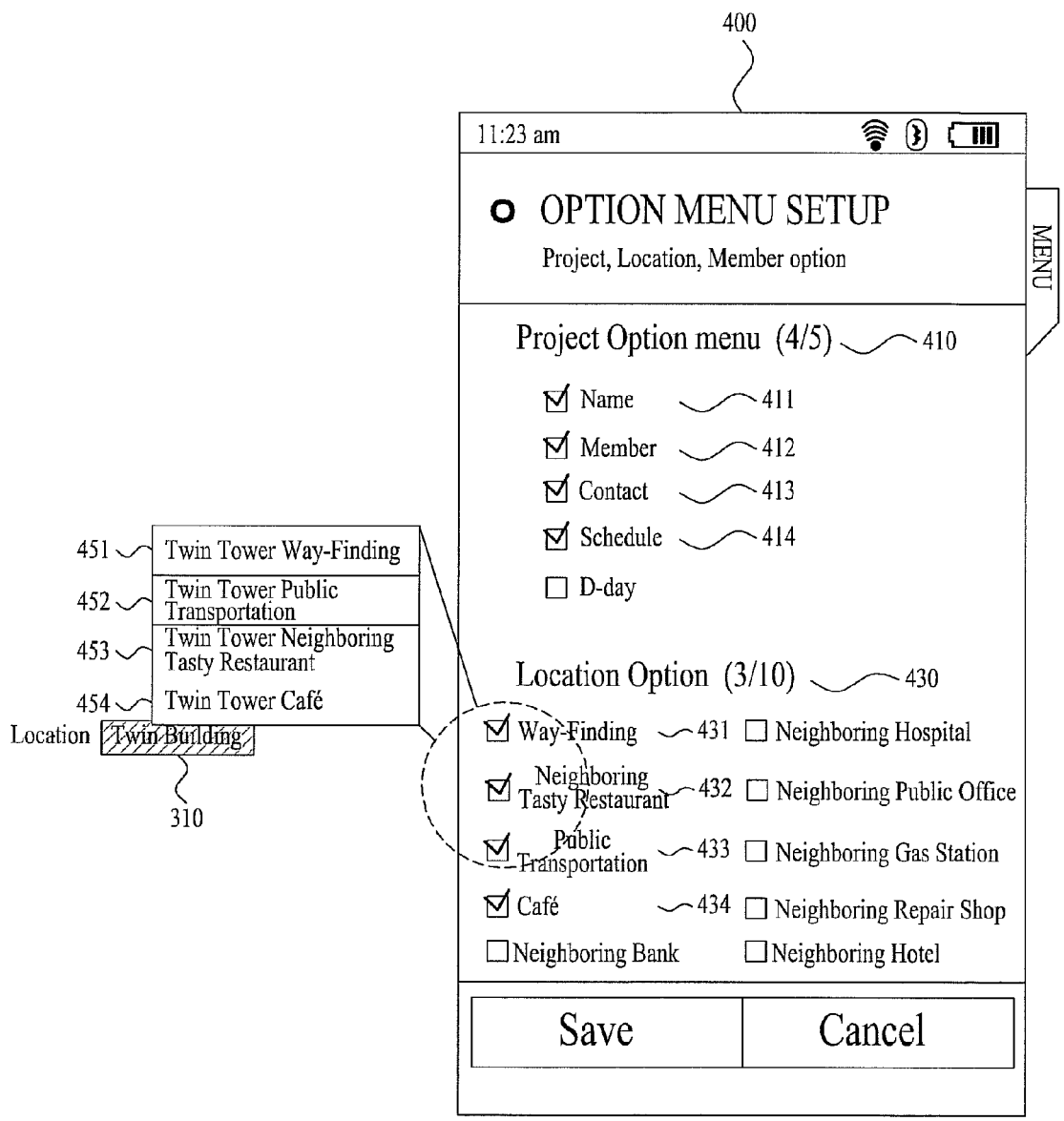
FIG. 4 is a diagram illustrating a picture illustrating relation between option items and menu items.

FIG. 4 is a diagram illustrating a picture of relation between option items and menu items.

In reference to FIG. 4, a screen 400 displays option sets 410 and 430. Here, an option set 410 is configured of words indicating project name and. The option set 410 includes Name 411, Member 412, Contact 413, and Schedule 414 as option items.

An option set 430 is configured of option items related to words indicating place name or building name. The option set 430 includes Way-Finding 431, Neighboring Tasty Restaurant 432, Public Transportation 433 and Café 434 as option items.

The controller 190 may search for Way-Finding 431, Neighboring Tasty Restaurant 432, Public Transportation 433 and Café 434 as option items related to 'Twin Building' of the word selected in the step of S110. In other words, the controller 190 translates a word indicating a building name from 'Twin Building' and it searches for Road Map 431, Neighboring Tasty Restaurant 432, Public Transportation 433 and Café 434 as option items related to this building name.

The controller 190 generates at least one menu item by using the selected word and the searched option items (S115). Here, the controller 190 composes the selected word and name of the searched option items and it generates a name of the menu item or information indicated by the menu item. Alternatively, the controller 190 may compose words similar to the selected word and the name of the searched option item and it generates a name of the menu item or information indicated by the menu item. Also, the controller may generate composes words similar to the selected word and words similar to the name of the searched option item and it generates a name of the menu item or information indicated by the menu item.

The controller 190 may compose 'twin tower' similar to 'Twin Building 310' and each name of Way-Finding 431, Neighboring Tasty Restaurant 432, Public Transportation 433 and Café 434, to generate a menu item 451, a menu item 452, a menu item 453 and a menu item 454.

The display 150 displays at least one of the generated menu items on a first area of the screen (S120).

Figure 5:
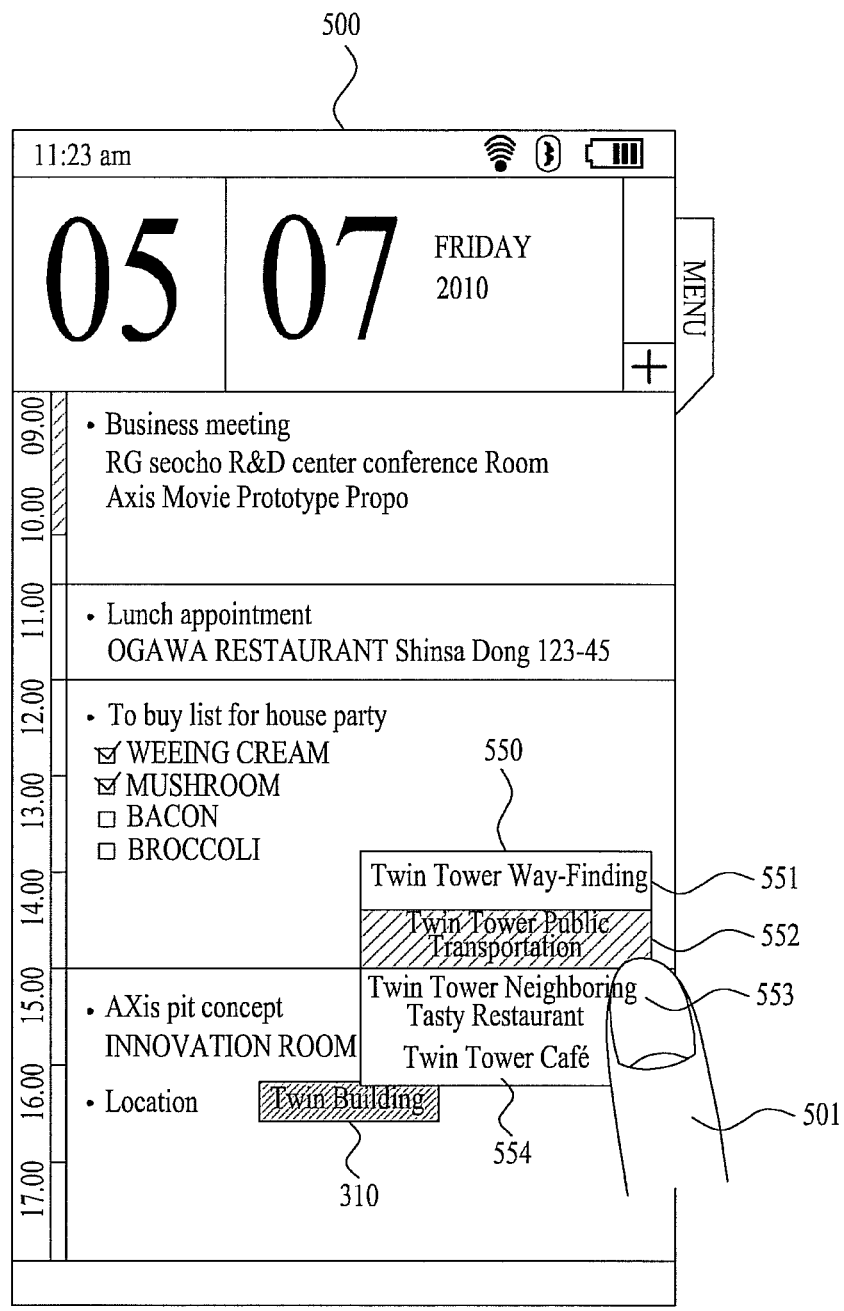
FIG. 5 is a diagram illustrating a screen displaying menu items according to an embodiment.

FIG. 5 is a diagram illustrating a screen displaying a menu item according to an embodiment.

In reference to FIG. 5, the display 150 may display a screen 500 in the step of S120. The screen 500 may display the generated menu item 451, menu item 452, menu item 453 and menu item 454 as an item 551, item 552, item 553 and item 554 of a floating popup menu 550, respectively.

The controller 190 detects menu item selecting action (S125). Here, the user allows his or her finger 501 to come near to or contact with the item 551, item 552, item 553 and item 554, to input the menu item selecting action. The controller 190 may detect the menu item selecting action when a down event is generated at a point having the menu item displayed thereon.

The controller 190 acquires information related to the menu item selected according to the menu item selecting action (S130). Here, the controller 190 may transmit a signal requesting search for information to a server or another electronic device and it may receive a search result for the information from the server or another electronic device. In addition, the controller 190 may search the information in information stored in a computer readable storage medium.

For example, when a menu item selecting action specifying selection of a twin tower public transportation 552 is detected in the step of S125, the controller 190 may search for information about a public transportation to go to Twin Tower. Here, the controller 190 may search for the information related to the public transportation, with determining a point in which the electronic device is located as starting point. The information on the point having the electronic device 100 located therein may be received via the mobile communication unit 115 or the network interface 130. Alternatively, the controller 190 may search for the information on the public transportation, with determining a point inputted by the user as starting point.

The display 150 displays the acquired information (S135).

Figure 6:
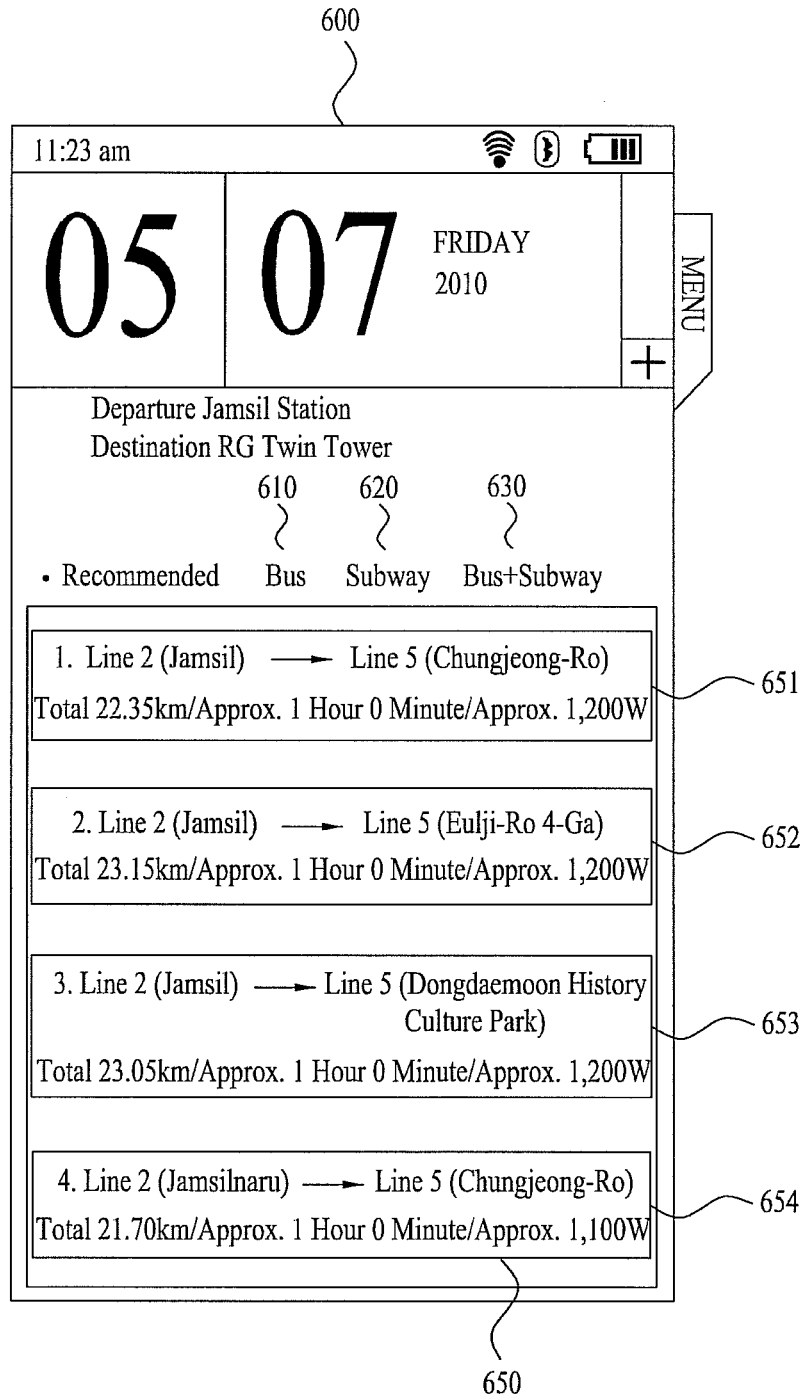
FIG. 6 is a diagram illustrating a screen displaying information related to a selected word.

FIG. 6 is a diagram illustrating a screen displaying information related to the selected word.

In reference to FIG. 6, the display 150 may display a screen 600 in the step of S135. The screen 600 may display an area 610 configured to receive request for transportation information to go to 'Twin Tower' by bus, an area 620 configured to receive request for transportation information to go to 'Twin Tower' by subway, and an area 630 configured to receive request for transportation information to go to 'Twin Tower' by bus and subway. The user may locate and select an indicator in the area 610, area 620 and area 630. Alternatively, the user may allow his or her finger to approach to or he or she may finger-touch the area 610, area 620 and area 630, and then information related to the selected area may be displayed.

The screen 600 displays an area 650 displaying the transportation information to go to 'Twin Tower' by subway. The user may locate and select an indicator on an area 651, area 652, area 653 and area 654. Alternatively, the user allows his or her finger to approach to or to touch the area 651, area 652, area 653 and area 654 and then detail information on the transportation information indicated by the selected area may be displayed.

The controller 190 detects an option edit requesting action (S140). The electronic device 100 may provide a physical button or soft button to perform option editing requesting action. The electronic device 100 may store and implement a program including instructions for detecting a touch gesture representing the option edit requesting action.

The display 150 may display a screen to edit the option items (S145).

Figure 7:
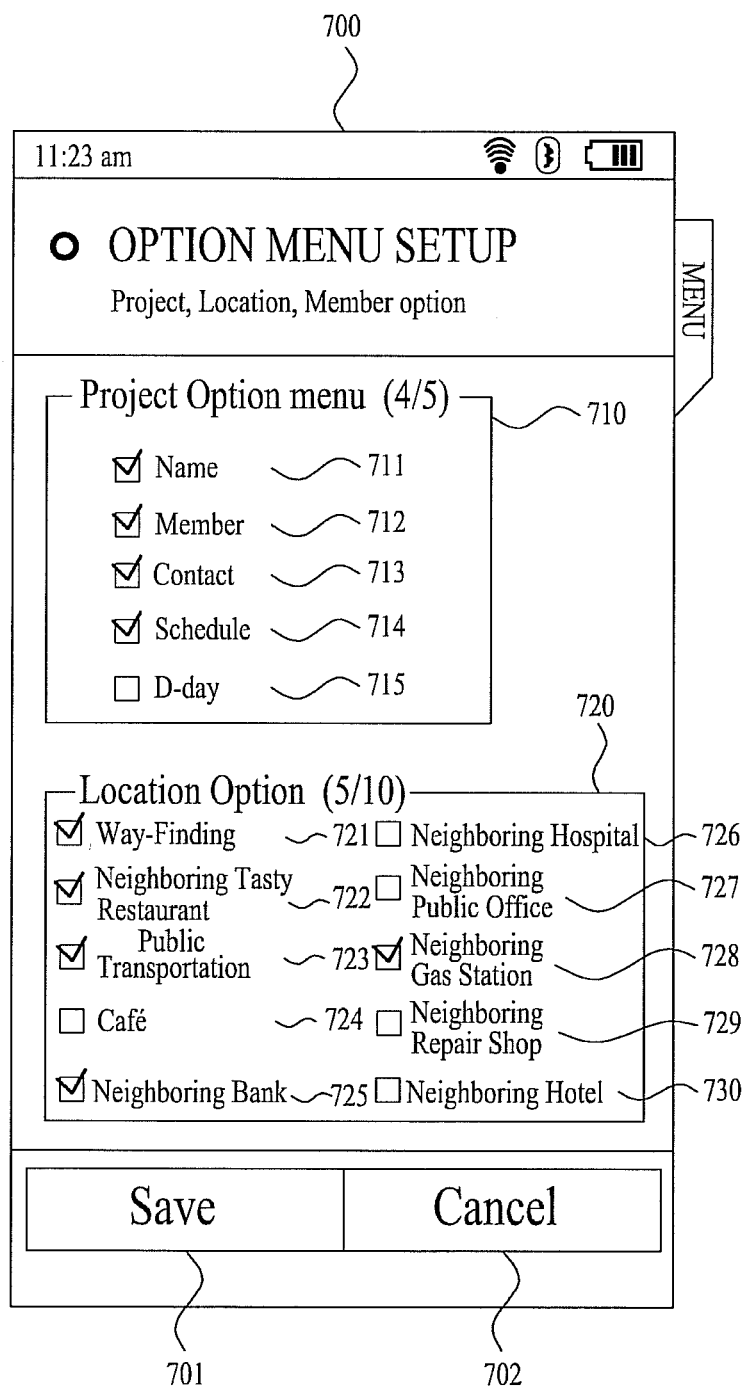
FIG. 7 is a diagram illustrating a screen to edit option items according to an embodiment.

FIG. 7 is a diagram illustrating a screen to edit option items according to an embodiment.

In reference to FIG. 7, the display 150 may display a screen 700 in the step of S145. The screen 700 displays an option set 710 having option items related to a word indicating a project name and an option set 720 having option items related to a word indicating a place name or building name.

An area 710 and area 720 display option items and option candidate items. The option set 710 has Name, Member, Contact and Schedule as option items and it has D-day as option candidate item. The option set 720 includes Way-Finding, Neighboring Tasty Restaurant, Transportation, Neighboring Bank and Neighboring Gas Station as option items, and it includes Café, Neighboring Hospital, Neighboring Public Office, Neighboring Repair Shop and Neighboring Hotel as option candidate items.

The controller 190 detects an option editing action (S150). The option editing action may include an action configured to add an option item, an action configured to delete an option item and an action configured to re-arrange option items.

The user may allow a check to be displayed in check box 715 to add 'D-day' to the option items. Also, the user may allow checks to be removed from check boxes 711, 712, 713, and 714 to delete Name, Member, Contact and Schedule from the option items. The user may change the display order of Name, Member, Contact and Schedule to allow the option items to be re-arranged.

In addition, the user may allow a check to be displayed in each check box 724, 726, 727, 729 and 730 to add Café, Neighboring Hospital, Neighboring Public Office, Neighboring Repair Shop and Neighboring Hotel to the option items. The user may allow a check from each check box 721, 722, 723, 725 and 728 to delete Way-Finding, Neighboring Tasty Restaurant, Transportation, Neighboring Bank and Neighboring Gas Station from the option items. The user may change the display order of Way-Finding, Neighboring Tasty Restaurant, Transportation, Neighboring Bank and Neighboring Gas Station, to re-arrange the option items.

The controller edits the option items in response to option editing action. Here, the option item editing may be performed when a soft button 701 is selected. Once the soft button 701 is selected, the controller 190 may process the detected option editing action to be canceled.

When detecting the action configured to add D-day to the option items, the controller 190 adds D-day to the option items of the option set 710. When detecting the action configured to delete Name from the option items, the controller deletes Name from the option items of the option set 710. when detecting the action configured to re-arrange the option items of the option set 710 to change the display order into the order of Member, Contact, Schedule and Name, the controller re-arrange the option items of the option set 710 in the order of Member, Contact, Schedule and Name.

Figure 8:
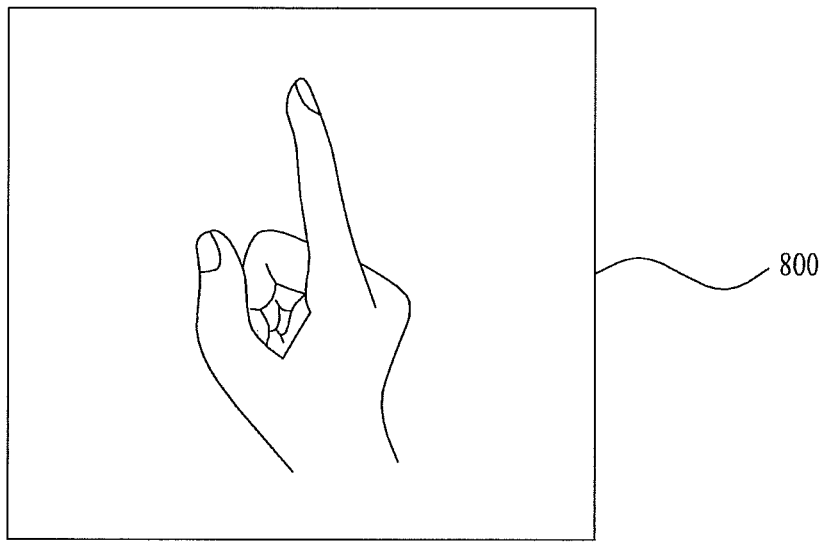
FIG. 8 is a diagram illustrating a space gesture according to an embodiment.
Figure 9:
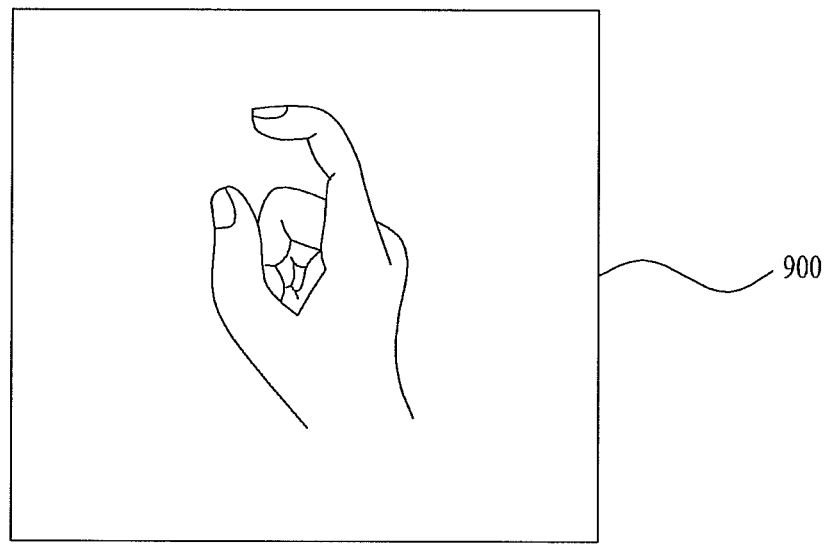
FIG. 9 is a diagram illustrating a space gesture according to another embodiment.

FIGS. 8 and 9 are diagrams illustrating a space gesture according to an embodiment.

In reference to FIGS. 8 and 9, a gesture 800 and a gesture 900 are continuous gestures. When the gesture 900 is recognized after the gesture 800, the gestures 800 and 900 may be recognized as single space gesture.

Figure 10:
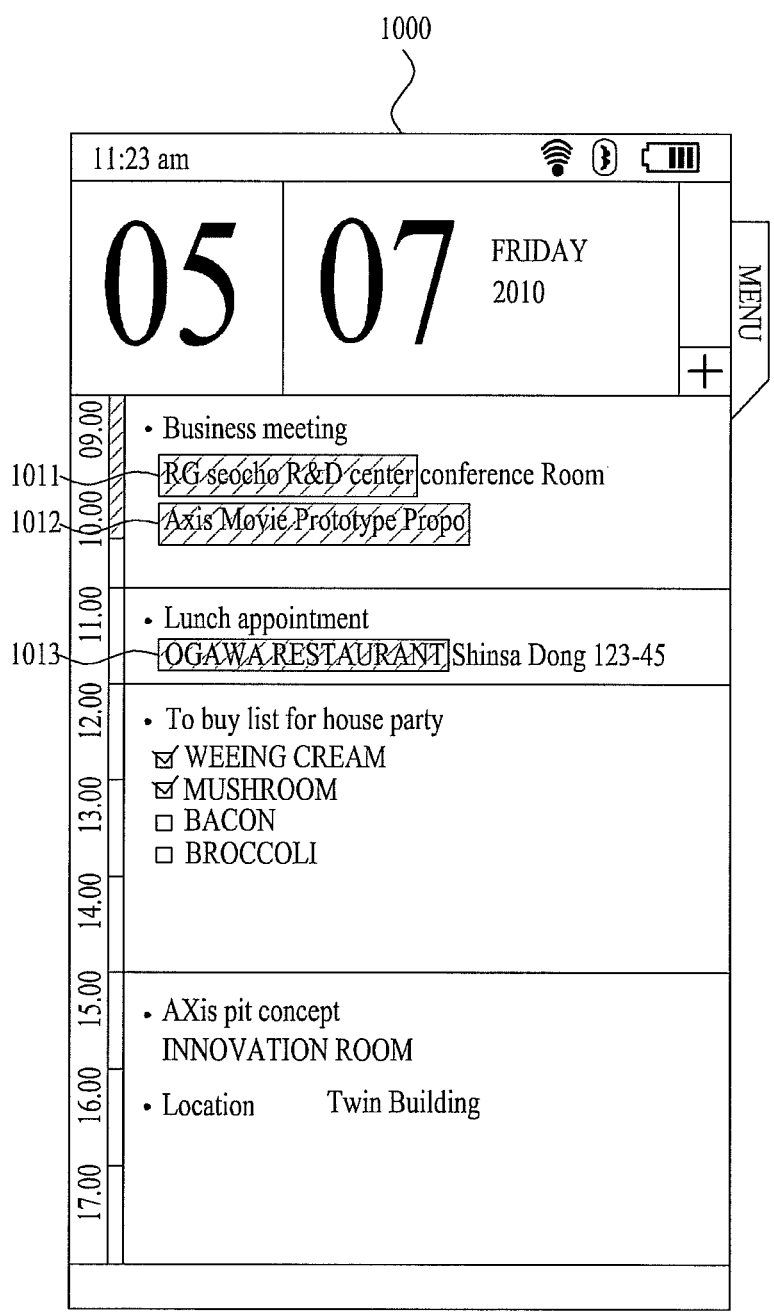
FIG. 10 is a diagram illustrating a screen displaying words according to an embodiment.
Figure 11:
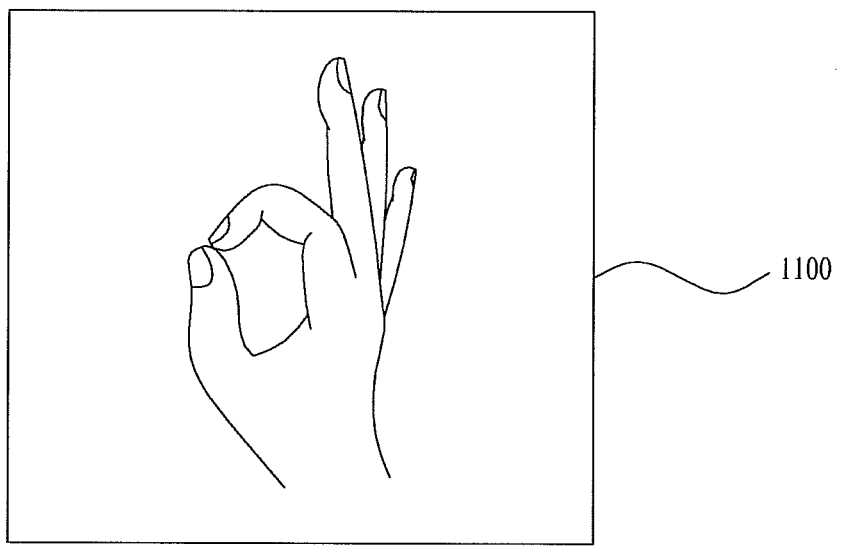
FIG. 11 is a diagram illustrating a space gesture according to another embodiment.
Figure 12:
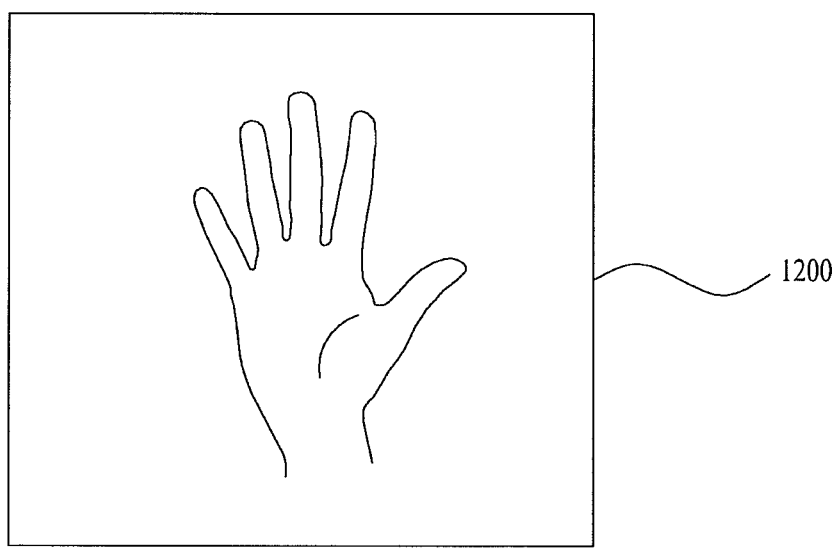
FIG. 12 is a diagram illustrating a space gesture according to another embodiment.
Figure 13:
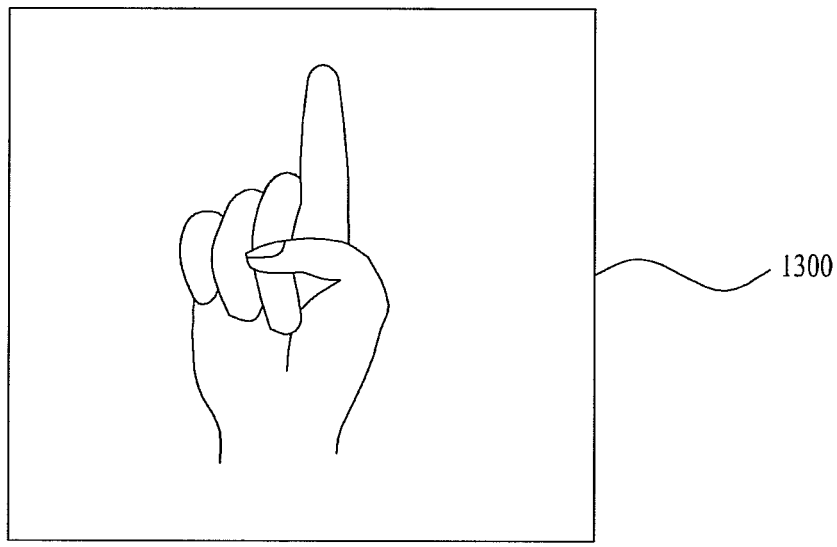
FIG. 13 is a diagram illustrating a space gesture according to another embodiment.
Figure 14:
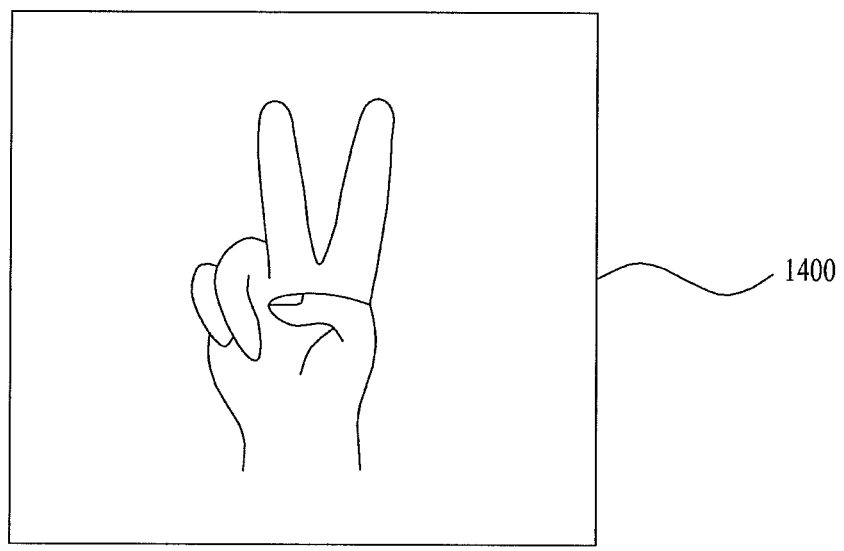
FIG. 14 is a diagram illustrating a space gesture according to another embodiment.
Figure 15:
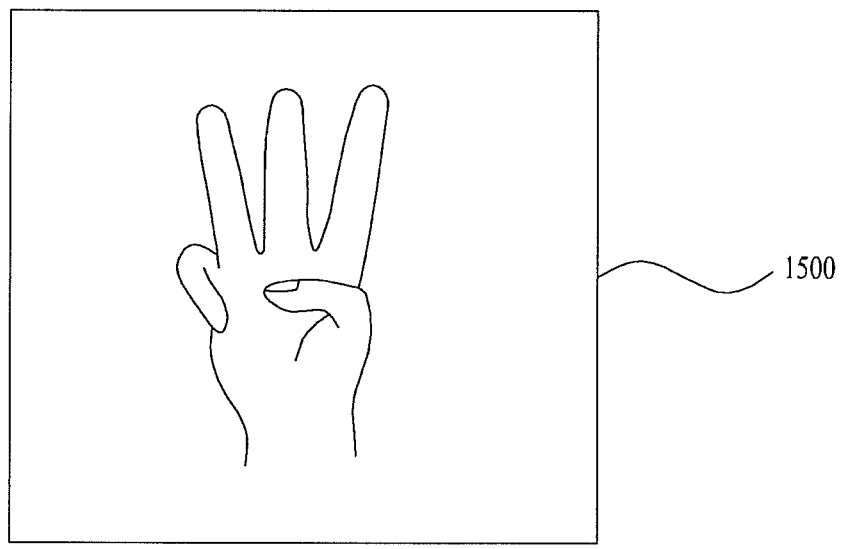
FIG. 15 is a diagram illustrating a space gesture according to another embodiment.

FIG. 10 is a diagram illustrating a screen displaying a word according to another embodiment.

In reference to FIG. 10, a screen 1000 is a diary page displaying information about a day schedule. When the gesture 800 and the gesture 900 are recognized continuously in a state of an indicator indicating a RG Seocho R&D Center 1011, the controller controls the indicator to indicate a phrase 'Axis Movie Prototype Prop 1012. When the gesture 800 and the gesture 900 are recognized continuously in a state of the indicator indicating the phrase 'Axis Movie Prototype Prop 1012, the controller controls the indicator to indicate a phrase 'OGAWA RESTAURANT' 1013.

FIGS. 11 to 15 are diagrams illustrating a space gesture according to another embodiment.

In reference to FIGS. 11 to 15, a gesture 1100 is a space gesture recognized as a selecting action. When the gesture 1100 is recognized, the controller 190 may detect the selecting action specifying selection of an area having an indicator positioned thereon and it may perform a specific work in response to detecting the selecting action. For example, when the gesture 1100 is recognized in a state of the indicator indicating a phrase 1011, the controller 190 may identify that the word selecting action specifying selection of the phrase 1011 is detected and it may search for option items related to 'RG Seocho R&D Center'.

A gesture 1200 is a space gesture recognized as former screen requesting action. When recognizing the gesture 1200, the controller 190 may identify a former screen requesting action and it may display a screen displayed before.

A gesture 1300, a gesture 1400, a gesture 1500 are space gestures recognized as a menu item selecting action. The gesture 1300 is action specifying selection of a first menu item and the gesture 1400 is action specifying selection of a second menu item and the gesture 1500 is action specifying selection of a third men item. For example, when detecting the gesture 1300 in a state of a screen 500 being displayed, the controller 190 may perform information search for Twin Tower road map which is a search word indicated by a menu item 551. When detecting the gesture 1500, the controller 190 may perform information search for neighboring tasty restaurants near Twin Tower which is a search word indicated by a menu item 553.

The present invention may be embodied as code readable by a computer in a recording medium readable by a computer. The recording medium includes all kinds of recording devices capable of store data readable by a computer device. For example, the recording medium readable by the computer may be a ROM, RAM, CD-ROM, magnetic tape, floppy disk, optical data storing device, and it may be embodied as a carrier wave type (for example, transmission via internet). The recording medium readable by the computer may be distributed in a computer unit connected via a network and a code readable by the computer in distribution may be stored in the recording medium to be implemented.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents. Accordingly, the present invention is directed to an electronic device and a method for providing a menu.

An object of the present invention is to provide an electronic device capable of allow a user to have access to desired information smoothly and a method for providing a method, using the same.

Another object of the present invention is to provide a computer readable medium recording a program configured to implement the method for providing the menu.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for providing a menu includes steps of: displaying a plurality of words on a screen; detecting a first action specifying selection of at least one of the displayed words; searching for an option item related to the word selected by the first action; generating at least one menu item based on the selected word and the searched option item; and displaying at least one menu item generated in a first area of the screen.

The word may indicate at least one of place name, project name, name, shop name, building name or product name.

The menu item may be displayed in the first area as Floating Popup Menu.

The method for providing the menu may further include steps of detecting a second action specifying selection of one of the menu items; acquiring information related to the menu item selected by the second action; and displaying the acquired information.

The step of acquiring the information may include steps of transmitting a signal requesting search for the information; and receiving a search result for the information.

The step of acquiring the information may include a step of searching for information stored in a computer readable storage medium for the information.

The menu item may be arranged and displayed according to the arrangement order of the option item.

The method for providing the menu may further include steps of: displaying a screen to edit the option item; detecting a second action specifying edit of the option item; and editing the option item in response to detecting of the second action. Here, the editing of the option item may include at least one of option item adding, option item deleting and option item re-arranging.

The screen to edit the option item may display a plurality of option candidate items to be selected as option items.

In another aspect of the present invention, an electronic device includes a display configured to display a screen; one or more processors; a memory; and a program, wherein the program is stored in the memory and configured to be executed by the one or more processors, the program including instructions for displaying a plurality of words on the screen; instructions for detecting a first action specifying selection of at least one of the displayed words; instructions for searching an option item related to the word selected by the first action; instructions for generating at least one menu item based on the selected word and the searched option item; and instructions for displaying the generated menu item in a first area of the screen. Here, the word may indicate at least one of place name, project name, name, shop name, building name or product name.

The menu item may be displayed in the first area as Floating Popup Menu.

The program may further include instructions for detecting a second action specifying selection of one of the menu items; instructions for acquiring information related to the menu item selected by the second action; and instructions for displaying the acquired information.

The instructions for acquiring the information may include instructions for transmitting a signal requesting search for the information and instructions for receiving a search result for the information.

The instructions for acquiring the information may include instructions for searching the information from information stored in a computer readable storage medium.

The menu item may be arranged and displayed according to the arrangement order of the option item.

The program may further include instructions for displaying a screen to edit the option item; instructions for detecting a second action specifying edit of the option item; and instructions for editing the option item in response to detecting of the second action. Here, the editing of the option item may include at least one of option item adding, option item deleting and option item re-arranging.

The instructions for displaying the screen may include instructions for display a plurality of option candidate items to be selected as option items.

According to the electronic device and the method for providing the menu, when a specific phrase is selected from phrases displayed on a screen, a menu for inputting a command requesting display of information related to the selected phrase may be provided. As a result, the user can easily access to desired information.

It is to be understood that both the foregoing general description and the following detailed description of the present invention are exemplary and explanatory and are intended to provide further explanation of the invention as claimed.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A displaying method of an electronic device, the method comprising:

displaying a plurality of word identifiers on a screen;
detecting a first gesture while displaying the plurality of word identifiers; selecting one of the word identifiers based on the detected first gesture; obtaining a plurality of search options related to the selected word identifier;
determining a plurality of names of menu items based on the selected word identifier and the plurality of search options;
displaying the generated names of menu items;
detecting a second gesture while displaying the generated names of menu items;
selecting one of the displayed names based on the detected second gesture; obtaining information related to the selected name of the menu item; and displaying the obtained information on the screens
wherein the determining of the plurality, of names of menu items includes:
searching words similar to the selected word identifier and words similar to names of the plurality, of search options,
extracting a first part from the selected word identifier or words similar to the selected word identifier, and extracting a second part from names of the plurality, of search options or words similar to names of the plurality, of search options,
determining the name of the menu item based on combining of the extracted first part and the extracted second part, and
generating the plurality of names of menu items based on the determined name of the menu item, wherein the gesture is a space gesture.

2. The method of claim 1, wherein each of names of the menu items relates to a combination of at least a part of the word identifier and a part of the corresponding search option.

3. The method of claim 1, wherein the selected word identifier is a place name, a project name, a name, a shop name, a building name or a product name.

4. The method of claim 1, wherein displaying the names of menu items includes displaying a popup menu that includes the names of menu items.

5. The method of claim 1, wherein displaying the names of menu items includes displaying the names of menu items based on an arrangement order of the plurality of search options.

6. The method of claim 1, further comprising:
displaying a screen to edit the plurality of search options;
detecting a second gesture to edit the plurality of search options; and
editing the plurality of search options in response to detecting the second gesture.

7. The method of claim 6, wherein editing the plurality of search options comprises adding an additional search option, deleting a search option or rearranging the plurality of search options.

8. The method of claim 6, wherein displaying the screen to edit the of search options includes displaying at least one candidate search option to be selected as the search option.

* * * * *